(12) United States Patent
Yabuta et al.

(10) Patent No.: US 10,744,578 B2
(45) Date of Patent: Aug. 18, 2020

(54) PIPE CUTTING MACHINE

(71) Applicant: NAKATA MANUFACTURING CO., LTD., Osaka (JP)

(72) Inventors: Hiroaki Yabuta, Osaka (JP); Takeyuki Sato, Osaka (JP); Feizhou Wang, Osaka (JP); Hiromasa Kitayama, Osaka (JP); Jilong Yin, Osaka (JP)

(73) Assignee: NAKATA MANUFACTURING CO., LTD., Osaka (JP)

( * ) Notice: Subject to any disclaimer, the term of this patent is extended or adjusted under 35 U.S.C. 154(b) by 0 days.

(21) Appl. No.: 16/333,585

(22) PCT Filed: Sep. 14, 2017

(86) PCT No.: PCT/JP2017/033220
§ 371 (c)(1),
(2) Date: Mar. 14, 2019

(87) PCT Pub. No.: WO2018/052069
PCT Pub. Date: Mar. 22, 2018

(65) Prior Publication Data
US 2019/0255629 A1    Aug. 22, 2019

(30) Foreign Application Priority Data

Sep. 16, 2016 (JP) ................ 2016-182160
Jan. 20, 2017 (JP) ................ 2017-008510

(51) Int. Cl.
*B23D 45/12* (2006.01)
*B23D 45/10* (2006.01)
(Continued)

(52) U.S. Cl.
CPC ............ *B23D 21/00* (2013.01); *B23D 25/08* (2013.01); *B23D 33/02* (2013.01); *B23D 45/10* (2013.01);
(Continued)

(58) Field of Classification Search
CPC ...... B23D 21/00; B23D 21/003; B23D 25/08; B23D 33/02; B23D 45/10; B23D 45/20;
(Continued)

(56) References Cited

U.S. PATENT DOCUMENTS 3,768,350 A * 10/1973 Coulter ................ B23D 45/105
83/51

FOREIGN PATENT DOCUMENTS

| JP | H-04135116 | A | * | 5/1992 |
| JP | 3422576 | B2 | | 6/2003 |
| JP | 201017822 | A | * | 1/2010 |

OTHER PUBLICATIONS

International Search Report issued in PCT/JP2017/033220; dated Dec. 19, 2017.

* cited by examiner

*Primary Examiner* — Stephen Choi
(74) *Attorney, Agent, or Firm* — Studebaker & Brackett PC

(57) ABSTRACT

A pipe cutting machine comprises: rotary blades in a pair, with a plane at a right angle to a center line of a pipe, the rotary blades being arranged to face each other on both sides of a y axis in such a manner that blade edges of the rotary blades overlap each other in an x-axis direction; a straightforward driving mechanism that drives the rotary blades straightforward in opposite directions of a y-axis direction so as to make the rotary blades pass each other on the x axis and in the vicinity of the x axis; and power direction conversion mechanisms that move the rotary blades outwardly to get farther from the y axis for avoiding interference between the blade edges when the rotary blades pass each other on the x axis and in the vicinity of the x axis.

10 Claims, 6 Drawing Sheets

(51) Int. Cl.
  *B23D 47/00*  (2006.01)
  *B23D 21/00*  (2006.01)
  *B23D 45/20*  (2006.01)
  *B23D 47/04*  (2006.01)
  *B23D 25/08*  (2006.01)
  *B23D 33/02*  (2006.01)
  *B23D 47/12*  (2006.01)

(52) U.S. Cl.
  CPC .............. *B23D 45/12* (2013.01); *B23D 45/20* (2013.01); *B23D 47/00* (2013.01); *B23D 47/04* (2013.01); *B23D 47/12* (2013.01)

(58) Field of Classification Search
  CPC ........ B23D 45/12; B23D 47/12; B23D 47/04; B23D 47/00
  See application file for complete search history.

PIPE CUTTING MACHINE

TECHNICAL FIELD

The present invention relates to a pipe cutting machine used as a traveling cutting machine in a pipe manufacturing line, for example. More specifically, the present invention relates to a pipe cutting machine in which a milling cutter is used as a rotary blade, and a pipe is cut by moving the rotary blade in a plane at a right angle to the pipe while rotating the rotary blade. Here, the pipe cutting machine includes a traveling pipe cutting machine and a stationary pipe cutting machine. In the following description, a plane at a right angle to a pipe to be cut is called an x-y plane.

BACKGROUND ART

In a pipe manufacturing line, a traveling cutting machine is used for cutting a pipe being manufactured continuously to a constant size. The traveling cutting machine cuts the pipe to be manufactured by moving a rotary blade in a plane at a right angle to the pipe while traveling in synchronization with the pipe.

A cutting machine disclosed in patent literature 1 as such a pipe cutting machine is of a system where multiple rotary blades are caused to make circling motions along the outer peripheral surface of a pipe while being rotated. This cutting system is called a revolving system as the circling movements of the rotary blades in the pipe peripheral direction are revolving motions. This revolving system is particularly called an x-y system as the positions of the rotary blades are controlled in two directions of the axes x-y.

The revolving cutting system other than the x-y system includes: a θ-θ system in which swing arms are attached to multiple positions in the peripheral direction of a faceplate a pipe is to pass through while rotary blades are supported at the tips of the swing arms, and the swing angles of the swing arms and the rotation angle of the faceplate are controlled; and an R-θ system in which rotary blades are attached to multiple positions in the peripheral direction of a faceplate a pipe is to pass through so as to be movable in a radial direction, and the positions of the rotary blades in the radial direction and the rotation angle of the faceplate are controlled.

The revolving cutting machine has an advantage of allowing high-speed cutting using a rotary blade of a small diameter relative to a pipe diameter and a small stroke of the movement of the rotary blade. The revolving cutting machine having this advantage is used as a traveling cutting machine in a pipe manufacturing line as well as being used as a stationary cutting machine.

PRIOR ART LITERATURE

Patent Literature

Patent Literature 1: Japanese Examined Patent Publication No. 3422576

SUMMARY OF INVENTION

Problem to be Solved by Invention

The revolving cutting machine has a disadvantage in that, as the positions of multiple rotary blades are required to be controlled in two directions in the x-y plane, a driving mechanism and a position control mechanism become more complicated and have larger sizes. This inevitably causes weight increase and cost increase, and may increase the likelihood of a failure.

There is also a straightforward system (R system) different from the revolving system in which, while one rotary blade is rotated, the rotary blade is moved linearly in the diameter direction of a pipe. While this system has a simple configuration, the rotary blade is required to have a radius sufficiently larger than the diameter of the pipe. The increased radius of the rotary blade causes a problem of reduction in cutting accuracy, etc.

The present invention is intended to provide a pipe cutting machine capable of cutting a pipe even of a large diameter efficiently with high accuracy in a short period of time, and achieving excellent economical efficiency and excellent durability with a simple, compact, and light-weight configuration.

Means of Solving Problem

To achieve the foregoing object, a pipe cutting machine of the present invention is a stationary or traveling pipe cutting machine that cuts a pipe at a right angle to the center line of the pipe, comprising:

rotary blades in a pair, with a plane at a right angle to the center line of the pipe to be cut defined as an x-y plane and the center of the pipe defined as a coordinate origin, the rotary blades being arranged to face each other on both sides of a y axis in such a manner that blade edges of the rotary blades overlap each other in the direction of an x axis;

a straightforward driving mechanism that drives the rotary blades in a pair straightforward in opposite directions of a y-axis direction so as to make the rotary blades in a pair pass each other on the x axis and in the vicinity of the x axis; and a power direction conversion mechanism that changes part of straightforward driving force in the y-axis direction to force in the x-axis direction and moves at least one of the rotary blades in a pair outwardly to get farther from the y axis for avoiding interference between the blade edges when the rotary blades in a pair pass each other on the x axis and in the vicinity of the x axis.

In the pipe cutting machine of the present invention, the rotary blades in a pair, which are arranged on both sides of the y axis in the x-y plane in such a manner that the blade edges overlap each other in the x-axis direction, are driven straightforward in opposite directions of the y-axis direction. When the rotary blades in a pair pass each other on the x axis and in the vicinity of the x axis, part of straightforward driving force in the y-axis direction is converted to force in the x-axis direction, and the rotary blades in a pair move in directions in which the rotary blades get farther from the y axis, namely, make outward separating movements. By doing so, interference is avoided between the respective blade edges of the rotary blades in a pair. In the pipe cutting machine of the present invention, the power direction conversion mechanism comprises: a blade biasing mechanism that applies biasing force to at least one of the rotary blades in a pair inwardly to get closer to the y axis and holds the biased rotary blade at an inner movement limit; and a guide mechanism that causes the at least one of the rotary blades in a pair to make an outward retreating movement against the biasing force when the rotary blades in a pair pass each other on the x axis and in the vicinity of the x axis. The blade biasing mechanism is an elastic member that elastically presses and holds at least one of the rotary blades in a pair at the inner movement limit, or a pressure mechanism using a fluid pressure that presses and holds at least one of the rotary blades in a pair under the fluid pressure at the inner movement limit. The guide mechanism includes a curved guide projecting outwardly. The rotary blades are driven by a hydraulic motor. The hydraulic motor is directly coupled to the rotary blades. The pipe cutting machine of the present invention further comprises a front clamp and a back clamp arranged on a front side and a back side respectively as viewed from a cutting plane for cutting with the rotary blades in a pair and used for fixing the pipe. The back clamp clamps the pipe in the y-axis direction corresponding to directions in which the rotary blades are driven straightforward. Both the front clamp and the back clamp clamp the pipe in the y-axis direction corresponding to the directions in which the rotary blades are driven straightforward. The pipe cutting machine of the present invention comprises a cutting powder collection box that covers a range of movements by the rotary blades in a pair to collect cutting powder resulting from cutting of the pipe. The cutting powder collection box includes an open/close door for opening and closing an opening part of the cutting powder collection box on the front side and supports the front clamp using the open/close door.

Advantageous Effects of Invention

In the pipe cutting machine of the present invention, the rotary blades in a pair, which are arranged on both sides of the y axis in the x-y plane in such a manner that the blade edges overlap each other in the x-axis direction, are driven straightforward in opposite directions of the y-axis direction. Further, interference between the blade edges is avoided by using the straightforward driving force in the y-axis direction. Thus, even if the pipe has a relatively large diameter, the pipe is still cut efficiently with high accuracy in a short period of time. Additionally, the simple configuration achieves compactness and a light weight, and excellent economical efficiency and excellent durability.

EMBODIMENTS FOR CARRYING OUT INVENTION

Figure 1:
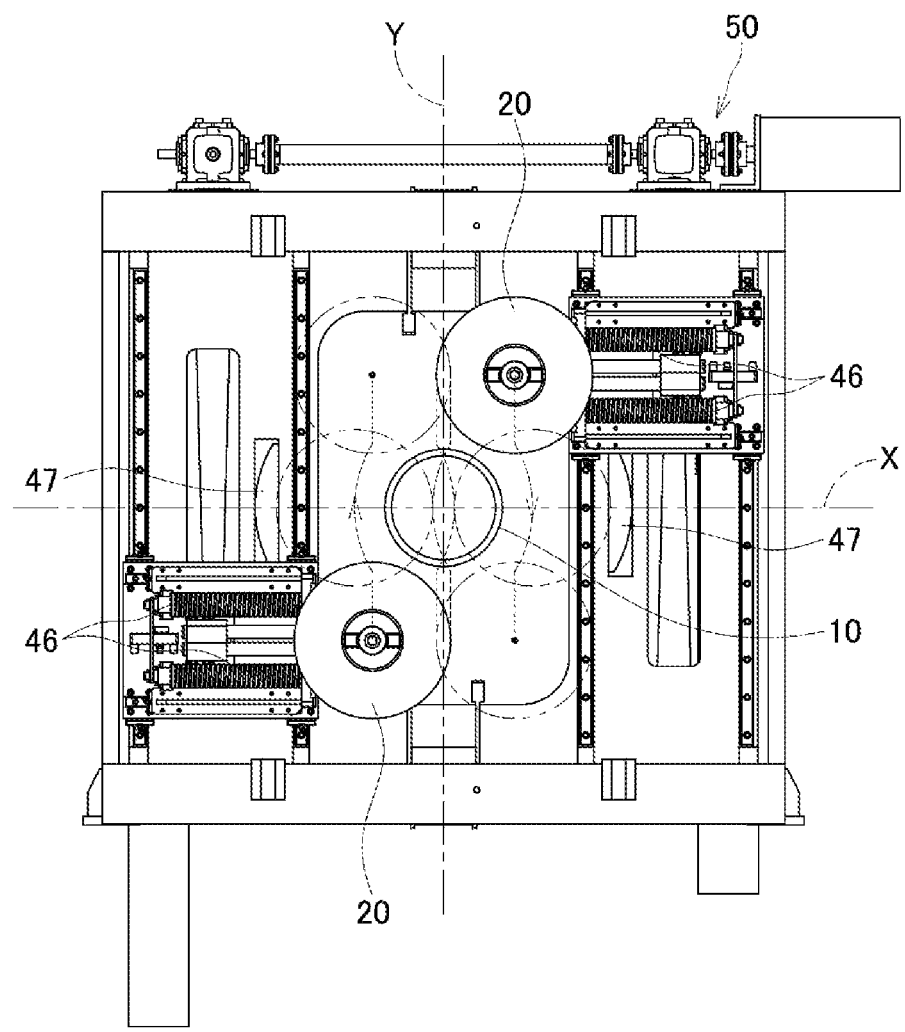
FIG. 1 is a front view of a pipe cutting machine showing a first embodiment of the present invention.

Embodiments of the present invention will be described below.
A pipe cutting machine of a first embodiment will be described first by referring to FIG. 1.
The pipe cutting machine of the first embodiment is a pipe cutting machine that cuts a pipe 10 at a right angle to the center line of the pipe 10. The pipe cutting machine includes: rotary blades 20, 20 in a pair, with a plane at a right angle to the center line of the pipe 10 to be cut defined as an x-y plane and the center of the pipe defined as a coordinate origin, the rotary blades 20, 20 being arranged on both sides of a y axis in such a manner that blade edges of the rotary blades 20, 20 overlap each other in the direction of an x axis; a straightforward driving mechanism 50 that drives the rotary blades 20, 20 in a pair straightforward in opposite directions of a y-axis direction so as to make the rotary blades 20, 20 in a pair pass each other on the x axis and in the vicinity of the x axis; and a power direction conversion mechanism 46 and a power direction conversion mechanism 47 that change part of straightforward driving force in the y-axis direction to force in the x-axis direction and move at least one (here, both) of the rotary blades 20, 20 in a pair outwardly to get farther from the y axis for avoiding interference between the blade edges when the rotary blades 20 in a pair pass each other on the x axis and in the vicinity of the x axis.

In the foregoing configuration, the rotary blades 20, 20 in a pair, which are arranged on both sides of the y axis in the x-y plane in such a manner that the blade edges overlap each other in the x-axis direction, are driven straightforward in opposite directions of the y-axis direction. When the rotary blades 20, 20 in a pair pass each other on the x axis and in the vicinity of the x axis, part of straightforward driving force in the y-axis direction is converted to force in the x-axis direction, and both the rotary blades 20, 20 in a pair make outward separating movements to get farther from the y axis. By doing so, interference is avoided between the respective blade edges of the rotary blades 20, 20 in a pair.

In this way, the pipe 10 is cut. Thus, even if the pipe 10 has a large diameter, the pipe 10 is still cut efficiently with high accuracy in a short period of time. Additionally, the simple configuration achieves the compactness and light weight of the machine, and favorable economical efficiency and favorable durability.

A pipe cutting machine of a second embodiment will be described next by referring to FIG. 2.
The pipe cutting machine of the second embodiment is a pipe cutting machine that cuts a pipe 10 at a right angle to the center line of the pipe 10. The pipe cutting machine includes: rotary blades 20, 20 in a pair, with a plane at a right angle to the center line of the pipe 10 to be cut defined as an x-y plane and the center of the pipe defined as a coordinate origin, the rotary blades 20, 20 being arranged on both sides of a y axis in such a manner that blade edges of the rotary blades 20, 20 overlap each other in the direction of an x axis; a straightforward driving mechanism 50 that drives the rotary blades 20, 20 in a pair straightforward in opposite directions of a y-axis direction so as to make the rotary blades 20, 20 in a pair pass each other on the x axis and in the vicinity of the x axis; and a power direction conversion mechanism 46 and a power direction conversion mechanism 47 that change part of straightforward driving force in the y-axis direction to force in the x-axis direction and move at least one (here, one) of the rotary blades 20, 20 in a pair outwardly to get farther from the y axis for avoiding interference between the blade edges when the rotary blades 20 in a pair pass each other on the x axis and in the vicinity of the x axis.

In the foregoing configuration, the rotary blades 20, 20 in a pair, which are arranged on both sides of the y axis in the x-y plane in such a manner that the blade edges of the rotary blades 20, 20 overlap each other in the x-axis direction, are driven straightforward in opposite directions of the y-axis direction. When the rotary blades 20, 20 in a pair pass each other on the x axis and in the vicinity of the x axis, part of straightforward driving force in the y-axis direction is converted to force in the x-axis direction, and one of the rotary blades 20, 20 in a pair makes an outward separating movement to get farther from the y axis. By doing so, interference is avoided between the respective blade edges of the rotary blades 20, 20 in a pair.

In this way, the pipe 10 is cut. Thus, even if the pipe 10 has a large diameter, the pipe 10 is still cut efficiently with high accuracy in a short period of time. Additionally, the simple configuration achieves the compactness and light weight of the machine, and favorable economical efficiency and favorable durability.

A pipe cutting machine of a third embodiment will be described next by referring to FIGS. 3 to 6. FIG. 1 shows principal structures of the pipe cutting machine shown in FIGS. 3 to 6.

The pipe cutting machine of the third embodiment is used as a traveling cutting machine that cuts a pipe at an exit of a resistance welded pipe manufacturing line, for example, ejected continuously from this line while traveling together with the pipe.

As shown in FIGS. 3 to 6, the pipe cutting machine of this embodiment is to cut a pipe 10 with rotary blades 20, 20 arranged to face each other on both sides of the pass center (namely, center line) of the pipe 10. In the description given below, a plane at a right angle to the pass center (namely, center line) of the pipe 10 is an x-y plane, an x axis is a horizontal line, a y axis is a vertical line perpendicular to the horizontal line, and a z axis is the pass center (namely, center line) of the pipe 10. In each of FIGS. 3 and 4, a near side is called a line exit side, specifically, an ejection side of the pipe 10 and a front side. Further, a far side is called a line entry side, specifically, an entry side of the pipe 10 and a back side.

This pipe cutting machine includes: the rotary blades 20, 20 arranged to face each other in the x-y plane, particularly on both sides of the y axis in such a manner that blade edges of the rotary blades 20, 20 overlap each other in an x-axis direction; a straightforward driving mechanism 50 that drives the rotary blades 20, 20 on both sides straightforward in opposite directions of a y-axis direction so as to make the rotary blades 20, 20 on both sides pass each other on the x axis and in the vicinity of the x axis; a power direction conversion mechanism that changes part of straightforward driving force in the y-axis direction to force in the x-axis direction and causes the rotary blades 20, 20 in a pair to make separating movements in directions in which the rotary blades 20, 20 get farther from the y axis (namely, outwardly) when the rotary blades 20, 20 on both sides pass each other on the x axis and in the vicinity of the x axis; and a clamp mechanism 60 that fixes the pipe 10 to be cut.

The rotary blades 20, 20 on both sides are arranged in a rectangular frame 30 surrounding the pass center (namely, z axis) of the pipe 10. More specifically, the rotary blades 20, 20 on both sides are mounted on blade units 40, 40 on both sides arranged in the frame 30 in such a manner that the blade edges overlap each other in the x-axis direction.

The frame 30 includes upper and lower horizontal members 31, 31 in a pair between which the z axis is held from above and below, right and left perpendicular members 32, 32 in a pair between which the z axis is held from both sides, a rectangular perpendicular back plate 33 fixed inside these members, and coupling rods 34, 34 on both sides for coupling the upper and lower horizontal members 31, 31 on the front side. The back plate 33 has a central portion where an opening 35 is provided for causing the pipe 10 to pass through.

An opening part of the frame 30 on the front side is closed by blocking plates 36, 36 on both sides arranged outside the coupling rods 34, 34 on both sides and double hinged open/close doors 37, 37 arranged inside the coupling rods 34, 34. The open/close doors 37, 37 having a double hinged structure closes the opening part of the frame 30 on the front side while leaving an opening 38 for causing the pipe 10 to pass through and space for the clamp mechanism 60, particularly for a front clamp 60A of the clamp mechanism 60 described later unclosed, and make opening and closing motions on the coupling rods 34, 34 on both sides as hinge shafts.

The frame 30 forms a cutting powder collection box together with the back plate 33 on the back side, the blocking plates 36, 36 on the front side, and the double hinged open/close doors 37, 37. One of the open/close doors 37, 37 functions as a support for the front clamp 60A as described in detail later.

The blade units 40, 40 on both sides are arranged to face each other on opposite sizes of the z axis as the pass center. The configuration of each the blade units 40, 40 includes a combination of a first movable body 41 movable in the y-axis direction and a second movable body 42 movable in the x-axis direction.

The first movable body 41 is located on the line exit side, namely, on the front side as viewed from the back plate 33 in the frame 30. The first movable body 41 is supported so as to be freely movable in the y-axis direction by two linear guides 43 in the y-axis direction attached to a surface of the back plate 33 on the front side. The first movable bodies 41 are driven synchronously in opposite directions of the y-axis direction and in a symmetric fashion by the straightforward driving mechanism 50.

The straightforward driving mechanism 50 extends from a position on the back side as viewed from the back plate 33 in the frame 30 to a position above the frame 30, and drives the blade units 40, 40 on both sides, particularly, the first movable bodies 41, 41 synchronously in opposite directions of the y-axis direction and in a symmetric fashion.

More specifically, the straightforward driving mechanism 50 includes screw rods 51, 51 on both sides supported perpendicularly and freely rotatably on the back side as viewed from the back plate 33, and ball screws 52, 52 on both sides threadedly engaged with the screw rods 51, 51 on both sides. The ball screws 52, 52 on both sides are coupled to the first movable bodies 41, 41 supported on the front side as viewed from the back plate 33. The screw rods 51, 51 on both sides are rotatably driven synchronously in opposite directions by a motor 53 and a coupling shaft 54 arranged on the frame 30. As a result, the first movable bodies 41, 41 on both sides are driven synchronously in opposite directions of the y-axis direction and in a symmetric fashion, as described above.

More specifically, when one of the first movable bodies 41, 41 moves down from an upper standby position toward a lower standby position in the frame 20, the other first movable body 41 moves up from a lower standby position toward an upper standby position in the frame 30. By doing so, the blade units 40, 40 on both sides are driven straightforward together with the rotary blades 20, 20 in opposite directions of the y-axis direction and in a symmetric fashion to pass each other on the x axis and in the vicinity of the x axis.

The second movable body 42 is arranged on the front side as viewed from the first movable body 41. The second movable body 42 has an inner portion near the y axis at which the rotary blade 20 and a rotary driver 21 for the rotary blade 20 are supported together. Here, the rotary driver 21 is a hydraulic motor. The rotary blade 20, which is on the front side as viewed from the rotary driver 21, is coupled without intervention of a deceleration mechanism (namely, directly coupled) to the rotary driver 21.

The second movable body 42 is attached through an elastic member 46 as a blade biasing mechanism to the first movable body 41 on the front side as viewed from the first movable body 41. More specifically, the second movable body 42 is supported freely movably in the x-axis direction by two linear guides 44 extending in the x-axis direction attached to a surface of the first movable body 41 on the front side, and is biased inwardly by elastic members 46 like coil springs fitted to two rods 45 also extending in the x-axis direction. While the second movable body 42 is elastically held by biasing force at an inner limit position in a movable range, the rotary blades 20, 20 at the blade units 40, 40 make their blade edges overlap each other in the x-axis direction.

Curved guides 47, 47 as guide mechanisms project from a surface of the back plate 23 on the front side in a symmetric fashion across the z axis as the pass center. Each of the curved guides 47 is on the x axis and includes an arc-like guide surface 48 projecting outwardly.

This will be described in detail. A part of the second movable body 42 passes through the first movable body 41 on the back side as viewed from the second movable body 42 to even project toward the back side as viewed from the first movable body 41, and supports a contact 49 arranged on the back side as viewed from the first movable body 41. The contact 49 is a roller abutting on the guide surface 48 of the curved guide 47 as the guide mechanism. The contact 49 is guided along the guide surface 48 when the blade unit 40 passes the x axis and in the vicinity of the x axis to be displaced outwardly.

As a result of this outward displacement of the second movable body 42, the blade unit 40 makes an outward retreating movement in an arc-like pattern against the biasing force of the elastic member 46 when the blade unit 40 passes the x axis and in the vicinity of the x axis, thereby avoiding the occurrence of interference between the rotary blades 20, 20 on both sides.

As understood from the above, the foregoing power direction conversion mechanism is to avoid interference between the blade edges occurring when the rotary blades 20, 20 on both sides pass each other on the x axis and in the vicinity of the x axis by converting part of straightforward driving force in the y-axis direction to force in the x-axis direction and causing the second movable bodies 42, 42 in the blade units 40, 40 to make outward separating movements when the rotary blades 20, 20 pass each other on the x axis and in the vicinity of the x axis. On either side, the configuration of the power direction conversion mechanism includes a combination of the elastic member 46 provided as the blade biasing mechanism in the blade unit 40 and the curved guide 47 provided as the guide mechanism on the surface of the back plate 23 on the front side.

The clamp mechanism 60 includes the front clamp 60A and a back clamp 60B as a front-back pair provided on the front side as viewed from the back plate 33 in the frame 30. The front clamp 60A and the back clamp 60B as the front-back pair are arranged in front of and behind the x-y plane as a plane for placement of the rotary blades 20, 20 and as a cutting plane (namely, on the front side and the back side as viewed from the x-y plane) respectively.

The front clamp 60A on the front side is to hold the pipe 10 fixedly from above and below on the front side as viewed from the cutting plane for cutting with the rotary blades 20, 20, particularly, at a position near the cutting plane. More specifically, the front clamp 60A includes: upper and lower clamp heads 61A, 61A for the holding; perpendicular rod-like support members 62A, 62A that support the upper and lower clamp heads 61A, 61A from above and below; upper and lower guide members 63A, 63A that guide the support members 62A, 62A in a perpendicular direction; and upper and lower springs 64A, 64A that bias the support members 62A, 62A upwardly and downwardly relative to the upper and lower guide members 63A, 63A.

The front clamp 60A, particularly, the guide members 63A, 63A of the front clamp 60A are attached to an inner edge portion of one of the double hinged open/close doors 37, 37, here, the right open/close door 37 from a viewer. Thus, when the right open/close door 37 is changed from a closed state to an opened state, the front clamp 60A makes a circling movement toward the front side about the right coupling rod 34 to open the rotary blades 20, 20 on the front side.

The back clamp 60B on the back side is to hold the pipe 10 fixedly from above and below on the back side as viewed from the cutting plane for cutting with the rotary blades 20, 20, particularly, at a position near the cutting plane. The back clamp 60B is arranged between the rotary drivers 21, 21 for driving the rotary blades 20, 20. The back clamp 60B includes: upper and lower clamp heads 61B, 61B; perpendicular rod-like support members 62B, 62B that support the upper and lower clamp heads 61B, 61B from above and below; and upper and lower guide members 63B, 63B that guide the support members 62B, 62B in the perpendicular direction. The upper and lower guide members 63B, 63B are supported by the frame 30.

Cylinders 65, 65 provided above and below the frame 30 and used in common between the front and the back press the support members 62A, 62A of the front clamp 60A and the support members 62B, 62B of the back clamp 60B from above and below through up-down heads 66, 66 also used in common between the front and the back. By doing so, the pipe 10 is held fixedly from above and below at each of a position on the front side as viewed from the cutting plane and near the cutting plane and a position on the back side as viewed from the cutting plane and near the cutting plane by the clamp heads 61A, 61A of the front clamp 60A and the clamp heads 61B, 61B of the back clamp 60B.

The upper and lower support members 62B, 62B of the back clamp 60B are coupled to the upper and lower up-down heads 66, 66. Meanwhile, the upper and lower support members 62A, 62A of the front clamp 60A are uncoupled to (disengaged from) the upper and lower up-down heads 66, 66 for allowing the front clamp 60A to make a circling movement toward the front side.

As a result of these coupled state and uncoupled state, when the upper and lower up-down heads 66, 66 return to their original positions, the upper and lower support members 62B, 62B of the back clamp 60B are driven to return to their original positions. Meanwhile, the upper and lower support members 62A, 62A of the front clamp 60A are not driven to return to their original positions by the upper and lower up-down heads 66, 66. As an alternative to this, the upper and lower support members 62A, 62A make motions to return to their original positions in response to biasing force applied from the upper and lower springs 64A, 64.

A pipe cutting motion by the pipe cutting machine of the third embodiment will be described next.

In a standby state, one of the blade units 40, 40 on both sides is at an upper standby position and the other blade unit 40 is at a lower standby position. The upper and lower clamp heads 61A, 61A of the front clamp 60A and the upper and lower clamp heads 61B, 61B of the back clamp 60B are both opened vertically. Further, the double hinged open/close doors 37, 37 are closed.

When the pipe 10 to be cut is passed through the cutting machine, the upper and lower cylinders 65, 65 are actuated to drive the upper and lower clamp heads 61A, 61A of the front clamp 60A and the upper and lower clamp heads 61B, 61B of the back clamp 60B in directions of closing these clamp heads. By doing so, the pipe 10 is held from above and below and fixed in front of and behind the cutting plane.

After the pipe 10 is fixed, the rotary blades 20, 20 on both sides start to rotate. Together with these rotations, the blade units 40, 40 on both sides start to move straightforward from their standby positions to their opposite standby positions. More specifically, one of the blade units 40, 40 starts to move down from an upper standby position toward a lower standby position, and the other blade unit 40 starts to move up from a lower standby position toward an upper standby position.

By doing so, the rotary blades 20, 20 on both sides mounted on corresponding ones of the blade units 40, 40 on both sides move straightforward from symmetric positions across the x axis (namely, upper standby position and lower standby position) toward the x axis, pass each other on the x axis and in the vicinity of the x axis, and travel toward opposite symmetric positions (namely, lower standby position and upper standby position). The rotary blades 20, 20 on both sides are arranged at positions where their blade edges overlap each other in the x-axis direction. Thus, the pipe 10 is cut efficiently in a short period of time by the straightforward motions of the two rotary blades 20, 20 in the y-axis direction.

When the rotary blades 20, 20 on both sides are to pass each other on the x axis and in the vicinity of the x axis, the blade edges interfere with each other without any action. By contrast, the second movable bodies 42, 42 on both sides are guided by the curved guides 47, 47 on both sides while being biased inwardly by the elastic members 46, 46 like coil springs in the blade units 40, 40. This causes outward retreating movements against the biasing force, thereby avoiding the interference.

As a result, the pipe 10 is cut with the rotary blades 20, 20 on both sides. Cutting powder resulting from the cutting of the pipe 10 is collected in the frame 30 as the cutting powder collection box to prevent flying of the cutting powder to the periphery. The opening 35 provided at the back plate 33 is preferably closed by a lid plate, for example, while a hole allowing passage of the pipe 10 of the maximum diameter is left unclosed. In the case of a small-diameter pipe, it is still preferable that a member for covering a gap with the lid plate, for example, be provided at an outer peripheral part of a clamp head to be replaced. This prevents the cutting powder generated during the cutting from flying toward an upstream position. This functions together with the open/close door 37 at a downstream position to increase the efficiency in collecting the cutting powder in the frame 30, thereby increasing the effectiveness of the measure for cutting powder collection.

The features of the pipe cutting machine of this embodiment in terms of the configuration and the function will be described below.

The rotary blades 20, 20 on both sides make motions for retreating outwardly in the x-axis direction by using straightforward driving force in the y-axis direction, namely, by converting the straightforward driving force to force in the x-axis direction. Thus, these retreating motions do not require new power or a new driving source. More specifically, required power basically includes only rotary driving force for rotating the rotary blades 20, 20 on both sides and straightforward driving force in the y-axis direction. Thus, while the rotary blades 20, 20 are driven in two directions in the x-y plane, a mechanism for the driving is simplified.

Each of the rotary blades 20, 20 is used not for cutting the pipe 10 entirely but for cutting about a half of the pipe 10. This reduces time for cutting, compared to time for cutting the pipe 10 entirely. Further, the radius of each of the rotary blades 20, 20 is reduced, and this also contributes to simplification of the configuration.

The rotary blades 20, 20 on both sides do not make circling motions around the pipe 10 but they are driven straightforward in the y-axis direction, meaning that each of the rotary blades 20, 20 is to move in a narrow range. This contributes to size reduction and weight reduction of the pipe cutting machine in cooperation with the foregoing simplification of the driving mechanism.

One of the rotary blades 20, 20 moves down from an upper standby position toward a lower standby position and the other rotary blade 20 moves up from a lower standby position toward an upper standby position. Then, in subsequent cutting, the one of the rotary blades 20, 20 moves up from the lower standby position toward the upper standby position and the other rotary blade 20 moves down from the upper standby position toward the lower standby position. Thus, it becomes unnecessary for the rotary blades 20, 20 to make motions for returning to their original positions in preparation for the subsequent cutting to allow shortening of a cutting step.

The rotary blades 20, 20 on both sides make outward retreating movements in passing each other on the x axis and in the vicinity of the x axis. In this regard, the breadth of the pipe 10 is at a maximum on the x axis, so that the occurrence of separation of the rotary blades 20, 20 on both sides from the pipe 10 is avoided effectively. This increases a range of pipe diameters in which the rotary blades 20, 20 can be shared, making it possible to reduce the variety of the diameters, eventually, types of the rotary blades 20, 20. More specifically, one of the features of this pipe cutting machine is to allow cutting of pipes 10 having various types of diameters. A wide sharable range can be set by optimizing the outer diameters of the rotary blades 20, 20, the guide surface shapes of the curved guides 47, 47, the contact surface shapes of the upper and lower clamp heads 61A, 61A of the front clamp 60A, the contact surface shapes of the upper and lower clamp heads 61B, 61B of the back clamp 60B, etc.

No interference with a different unit is to occur on the front side as viewed from the cutting plane for cutting with the rotary blades 20, 20. This allows the pipe 10 to be fixed with the front clamp 60A at a position near the cutting plane. By contrast, there is a risk of interference with the blade units 40, 40 holding the rotary blades 20, 20 on the back side as viewed from the cutting plane. Hence, the pipe 10 cannot be fixed easily with the back clamp 60B at a position near the cutting plane.

In this regard, in the pipe cutting machine of this embodiment, the rotary blades 20, 20 on both sides do not make circling motions around the pipe 10 but they are driven straightforward in the y-axis direction and make outward retreating movements in the x-axis direction. This allows formation of linear space extending in the y-axis direction between the blade units 40, 40 on both sides. Meanwhile, directions of clamping by the front clamp 60A and the back clamp 60B are the y-axis direction, so that the front clamp 60A and the back clamp 60B are designed to extend long in the y-axis direction. This allows arrangement of the clamp mechanism 60, particularly arrangement of the back clamp 60B between the blade units 40, 40 on both sides, so that the pipe 10 can be fixed both at a position in front of and near the cutting plane and at a position behind and near the cutting plane.

More specifically, the blade units 40, 40 on both sides are each driven linearly in a direction (corresponding to a direction in which each of the rotary blades 20, 20 on both sides is driven linearly) same as the direction of clamping by the back clamp 60B. Thus, the pipe 10 can be fixed both at a position in front of and near the cutting plane and at a position behind and near the cutting plane. As a result, the pipe 10 is fixed firmly. This increases the efficiency in cutting the pipe 10 and extends the working lives of the rotary blades 20, 20.

In addition, in the pipe cutting machine of this embodiment, the direction of clamping by the front clamp 60A is also the y-axis direction, which is the same as the direction of clamping by the back clamp 60B. Thus, the front clamp 60A and the back clamp 60B are opened and closed by the upper and lower cylinders 65, 65 and the upper and lower up-down heads 66, 66 used in common between the front and the back. As a result, the mechanism for driving the clamp mechanism 60 is simplified.

The front clamp 60A is attached to one of the open/close doors 37, 37 (here, to the right open/close door 37 from a viewer). Thus, when the open/close doors 37, 37 are changed from a closed state to an opened state, the front clamp 60A makes a circling movement toward the front side about the right coupling rod 34 to open the rotary blades 20, 20 on the front side. This makes it possible to replace the rotary blades 20, 20 without the need of disassembling the frame 30 partially. As a result, replacement of the rotary blades 20, 20 is facilitated.

In the frame 30 on the front side, the clamp mechanism 60 is actuated to generate reaction force acting on the upper and lower horizontal members 31, 31 in directions of separating the horizontal members 31, 31 from each other. In this regard, the upper and lower horizontal members 31, 31 are coupled through the coupling shafts 34, 34. This ensures required strength while maintaining a light weight. The coupling shafts 34, 34 on both sides also function as hinge shafts for the open/close doors 37, 37, and this also contributes to weight reduction of the frame 30.

In addition, the rotary drivers 21, 21 for the rotary blades 20, 20 described herein are hydraulic motors. In addition to being light-weight, the hydraulic motors produce constant torques. Thus, the hydraulic motors can drive the rotary blades 20, 20 directly without intervention of a deceleration mechanism. This achieves size reduction to extend space formed between the blade units 40, 40 on both sides and facilitates arrangement of the back clamp 60B. Size reduction and weight reduction of the machine are promoted also from this viewpoint.

In addition, if the foregoing hydraulic motors drive the rotary blades 20, 20 at constant rotation speeds and the straightforward driving mechanism 50 controls speeds of moving up and down the rotary blades 20, 20 variably, the lives of the blade edges of the rotary blades 20, 20 can be extended.

Thus, even if the pipe 10 has a large diameter, the pipe 10 can still be cut efficiently in a short period of time also by the pipe cutting machine of the third embodiment. Additionally, the simple configuration achieves compactness and a light weight, and excellent economical efficiency and excellent durability.

In the embodiments, the x axis in the x-y plane is a horizontal line, and the y axis in the x-y plane is a vertical line perpendicular to the horizontal line. However, this is not the only case. The Y axis may be a horizontal line, and the x axis may be a vertical line perpendicular to the horizontal line. The directions of the two axes mean two directions at a right angle to each other in the x-y plane.

In the embodiments, the configuration of the power direction conversion mechanism includes a combination of the elastic member 46 provided as the blade biasing mechanism in the blade unit 40 and the curved guide 47 provided as the guide mechanism on the surface of the back plate 23 on the front side. However, the power direction conversion mechanism is not limited to a combination of the blade biasing mechanism and the guide mechanism but may be configured using a guide rail.

Figure 2:
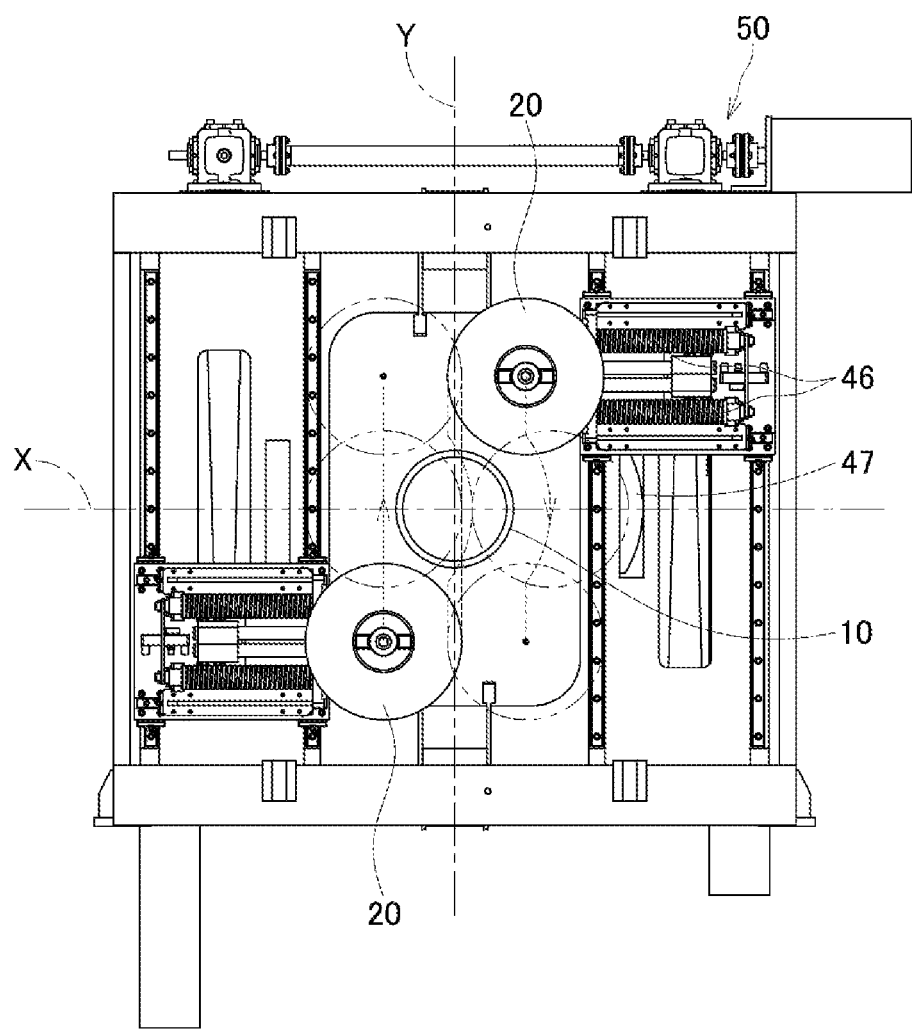
FIG. 2 is a front view of a pipe cutting machine showing a second embodiment of the present invention.
Figure 3:
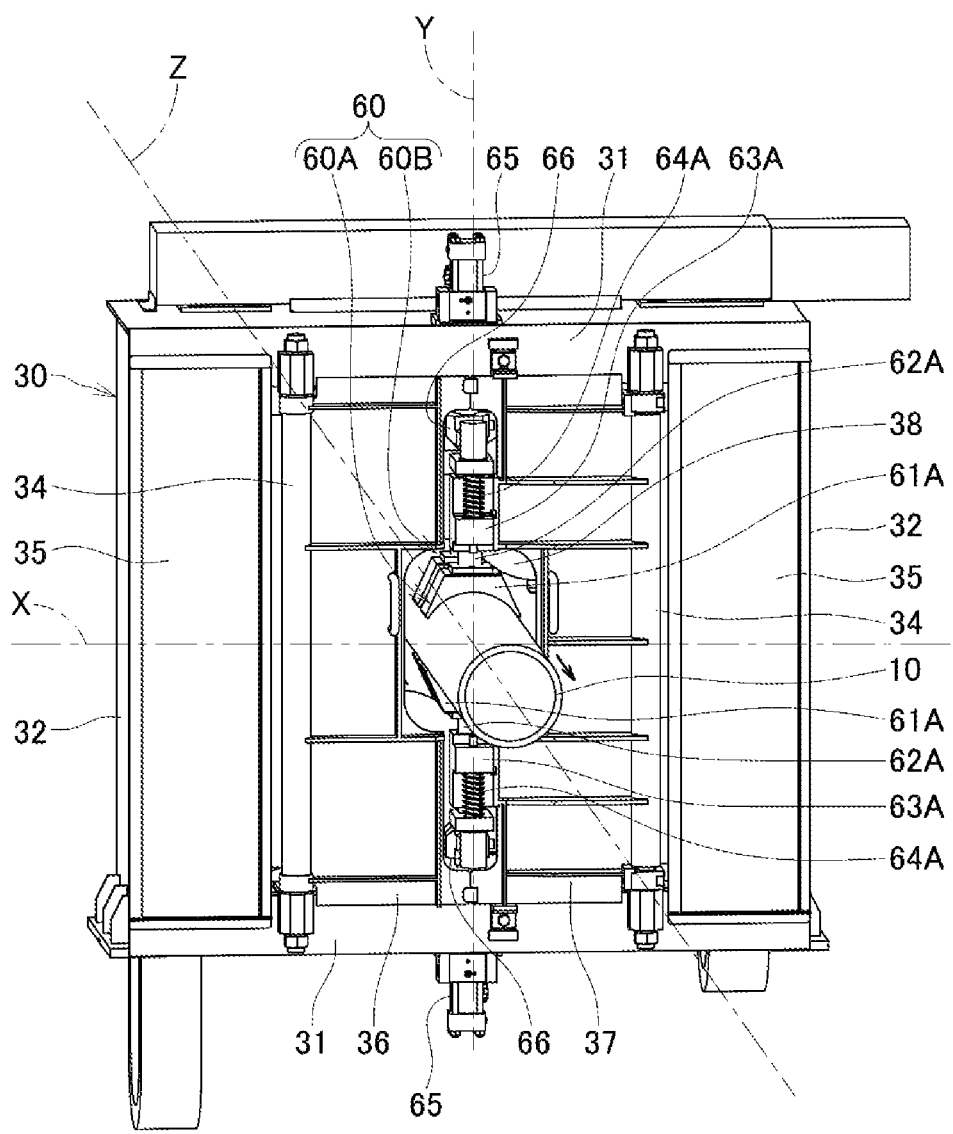
FIG. 3 is a perspective view of a pipe cutting machine showing a third embodiment of the present invention taken from the front.
Figure 4:
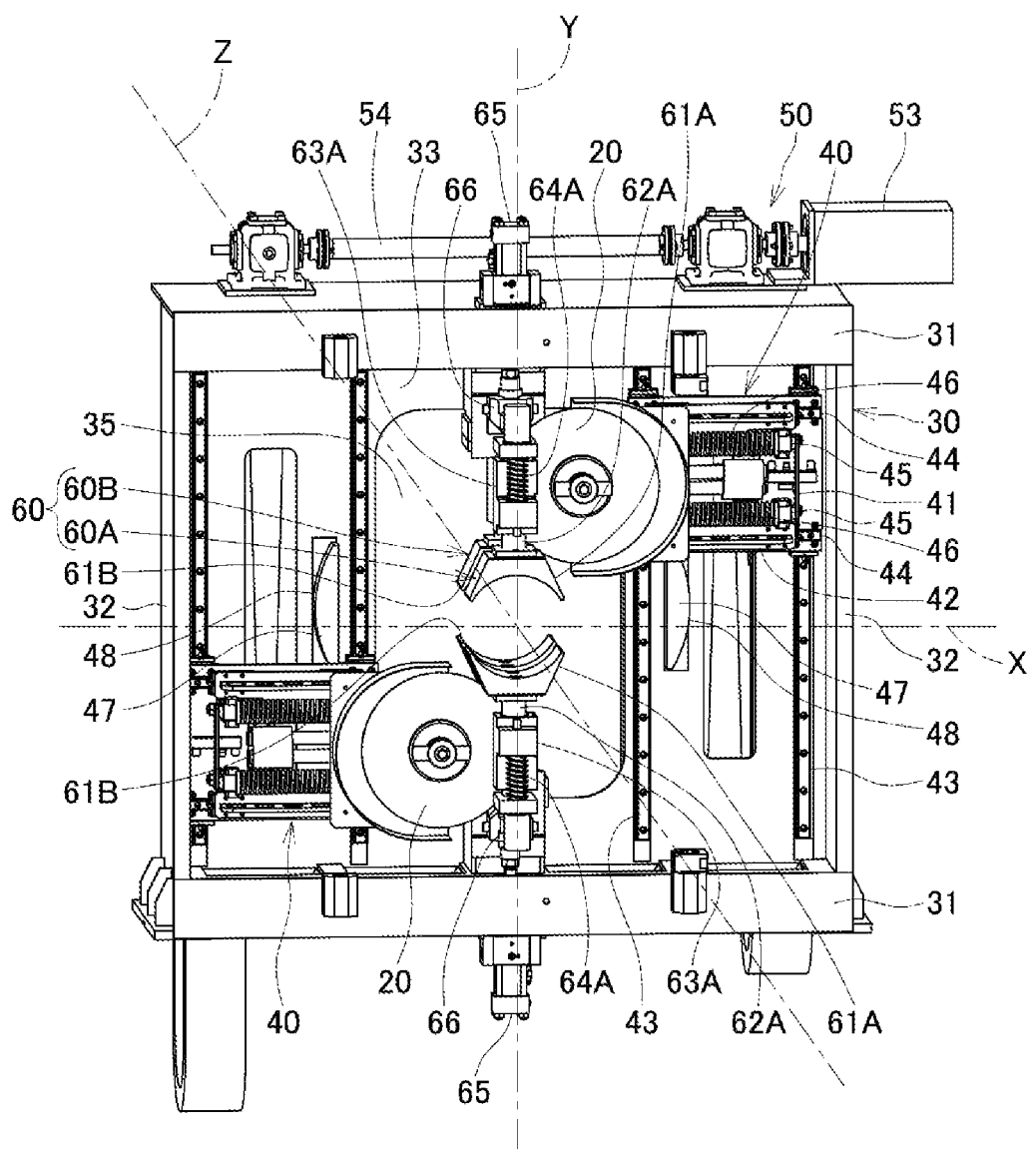
FIG. 4 is a perspective view of this pipe cutting machine taken from the front and showing a state where the pipe cutting machine is opened on a front side.
Figure 5:
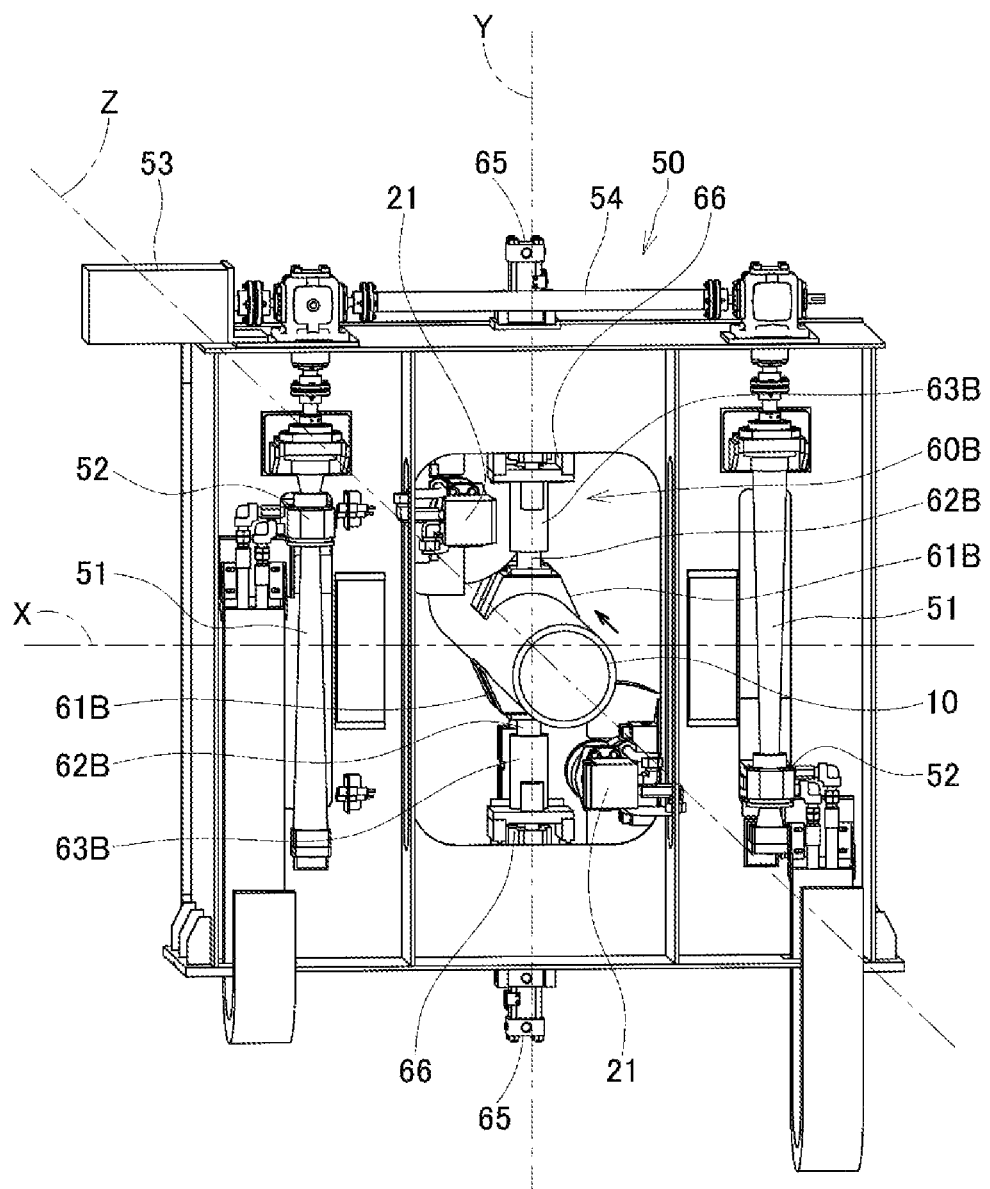
FIG. 5 is a perspective view of this pipe cutting machine taken from the back.
Figure 6:
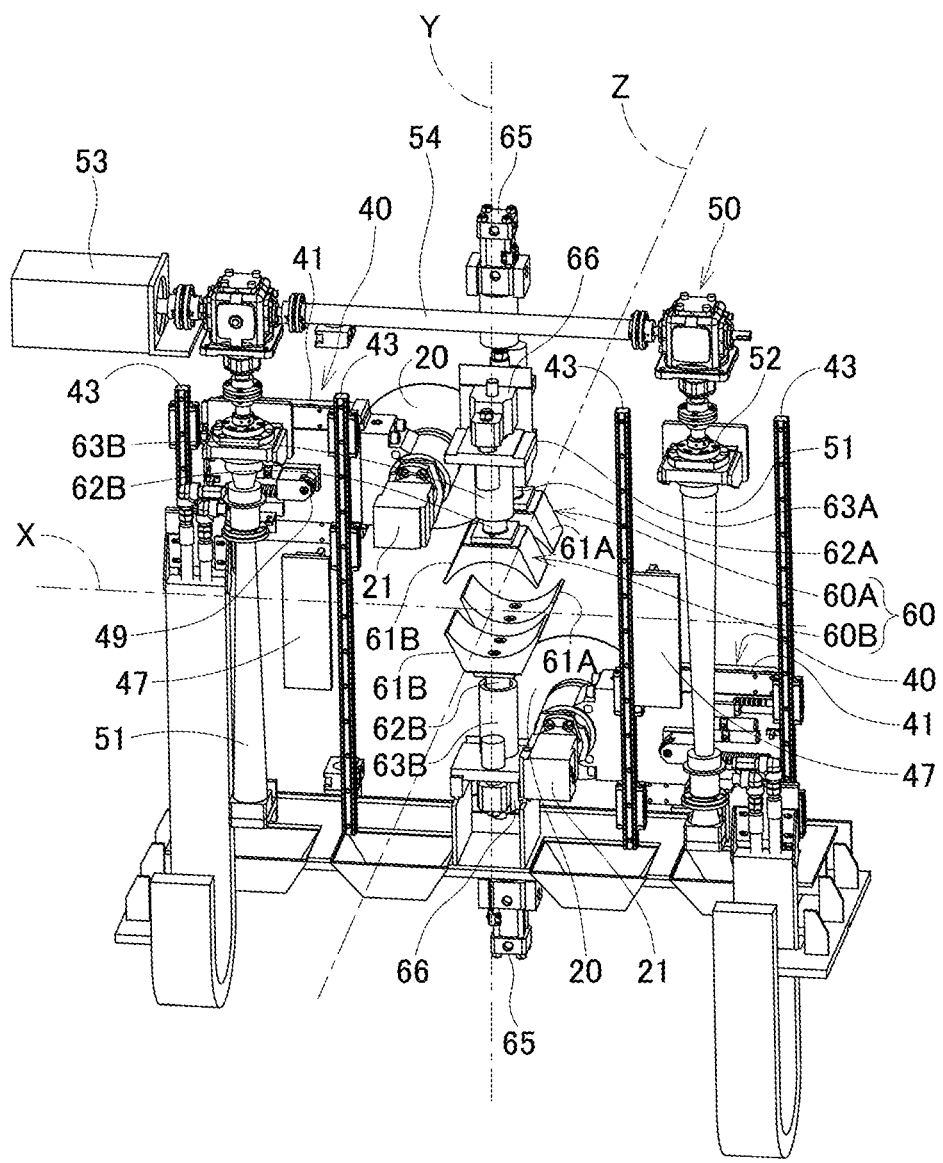
FIG. 6 is a perspective view of this pipe cutting machine taken from the back and showing principal structures.

Regarding the power direction conversion mechanism, in the second embodiment shown in FIG. 2, the elastic member 46 as the blade biasing mechanism is shown to be provided also for the rotary blade 20 belonging to the rotary blades 20, 20 in a pair and not to make an outward separating movement. However, this blade biasing mechanism can be omitted together with the guide mechanism and this rotary blade 20 can certainly be fixed in the x-axis direction.

If the configuration of the power direction conversion mechanism includes a combination of the blade biasing mechanism and the guide mechanism, the blade biasing mechanism of the foregoing embodiments is the elastic member 46 that elastically holds at least one of the rotary blades 20, 20 in a pair at an inner movement limit. Alternatively, the blade biasing mechanism may be a pressure mechanism such as a hydraulic cylinder or a pneumatic cylinder using a fluid pressure. More specifically, biasing force applied for holding at least one of the rotary blades 20, 20 in a pair at the inner movement limit can be a spring pressure or a fluid pressure such as a hydraulic pressure.

If the blade biasing mechanism is a pressure mechanism using a fluid pressure, the fluid pressure is applied to hold at least one of the rotary blades 20, 20 in a pair at the inner movement limit at a set pressure. When the rotary blades 20, 20 on both sides pass each other on the x axis and in the vicinity of the x axis, at least one of the rotary blades 20, 20 in a pair is pressed back outwardly by the guide mechanism under a pressure exceeding the set pressure to make a retreating movement. As a result, like in the case using the elastic member 46, interference between the rotary blades 20, 20 in a pair is avoided. In preference to the case using the elastic member 46, the pressure mechanism using a fluid pressure can increase pressing force (set pressure) easily, thereby contributing to size reduction of the blade biasing mechanism. This pressing force (set pressure) is easily adjustable. Thus, by applying pressing force larger than a set value during initial cutting and reducing the pressing force to the set value immediately after the cutting, for example, it becomes possible to make a cutting motion more stably.

In addition, if the diameter of the pipe 10 is increased, the curved guide 47 as the guide mechanism needs to be replaced. This extends a distance the rotary blade 20 moves in the x-axis direction, so that the elastic member 46 may also become a target of replacement. If a pressure mechanism using a fluid pressure such as a hydraulic cylinder is employed instead of the elastic member 46 for obtaining biasing force, a variable operation stroke and variable biasing force can be achieved. This acts advantageously for cutting a group of products with a wide range of diameters of the pipes 10, making it possible to extend the applicability of the cutting machine.

REFERENCE SIGNS LIST

10 Pipe
20 Rotary blade
21 Rotary driver
30 Frame
31 Horizontal member
32 Perpendicular member
33 Back plate
34 Coupling rod
35 Opening
36 Blocking plate
37 Open/close door
40 Blade unit
41 First movable body
42 Second movable body
43, 44 Linear guide
45 Rod
46 Elastic member (blade biasing mechanism)
47 Curved guide (guide mechanism)
48 Guide surface
49 Contact
50 Straightforward driving mechanism
51 Screw rod
52 Ball spring
53 Motor
54 Coupling shaft
60 Clamp mechanism
60A Front clamp
60B Back clamp
61A, 61B Clamp head
62A, 62B Support member
63A, 63B Guide member
64A Spring
65 Cylinder
66 Up-down head

The invention claimed is:

1. A stationary or traveling pipe cutting machine that cuts a pipe at a right angle to the center line of the pipe, comprising:
    rotary blades in a pair, with a plane at a right angle to the center line of the pipe to be cut defined as an x-y plane and the center of the pipe defined as a coordinate origin, the rotary blades being arranged to face each other on both sides of a y axis in such a manner that blade edges of the rotary blades overlap each other in the direction of an x axis;
    a straightforward driving mechanism that drives the rotary blades in the pair straightforward in opposite directions of a y-axis direction so as to make the rotary blades in the pair pass each other on the x axis and in the vicinity of the x axis; and
    a power direction conversion mechanism that moves at least one of the rotary blades in the pair in an outward direction in which the at least one of the rotary blades in the pair gets farther from the y axis for avoiding interference between the blade edges when the rotary blades in the pair pass each other on the x axis and in the vicinity of the x axis, wherein
    the power direction conversion mechanism comprises:
        a blade biasing mechanism that applies biasing force to the at least one of the rotary blades in the pair in an inward direction in which the at least one of the rotary blades gets closer to the y axis and holds the biased rotary blade at an inner movement limit; and
        a guide mechanism that causes the at least one of the rotary blades in the pair to make an outward retreating movement in the outward direction against the biasing force when the rotary blades in the pair pass each other on the x axis and in the vicinity of the x axis.

2. The pipe cutting machine according to claim 1, wherein the blade biasing mechanism is an elastic member that elastically presses and holds at least one of the rotary blades in the pair at the inner movement limit.

3. The pipe cutting machine according to claim 1, wherein the blade biasing mechanism is a pressure mechanism using a fluid pressure that presses and holds at least one of the rotary blades in the pair under the fluid pressure at the inner movement limit.

4. The pipe cutting machine according to claim 1, wherein the guide mechanism includes a curved guide projecting in the outward direction.

5. The pipe cutting machine according to claim 1, wherein the rotary blades are driven by a hydraulic motor.

6. The pipe cutting machine according to claim 5, wherein the hydraulic motor is directly coupled to the rotary blades.

7. The pipe cutting machine according to claim 1, further comprising:
    a front clamp and a back clamp arranged on a front side and a back side respectively as viewed from a cutting plane for cutting with the rotary blades in the pair and used for fixing the pipe.

8. The pipe cutting machine according to claim 7, wherein the back clamp clamps the pipe in the y-axis direction corresponding to directions in which the rotary blades are driven straightforward.

9. The pipe cutting machine according to claim 8, wherein both the front clamp and the back clamp clamp the pipe in the y-axis direction corresponding to the directions in which the rotary blades are driven straightforward.

10. The pipe cutting machine according to claim 7, comprising:
    a cutting powder collection box that covers a range of movements by the rotary blades in the pair to collect cutting powder resulting from cutting of the pipe, wherein
    the cutting powder collection box includes an open/close door for opening and closing an opening part of the cutting powder collection box on the front side and supports the front clamp using the open/close door.

* * * * *